Oct. 31, 1944.   E. M. SIMS ET AL   2,361,422
WORK FEEDING DEVICE
Filed June 29, 1942
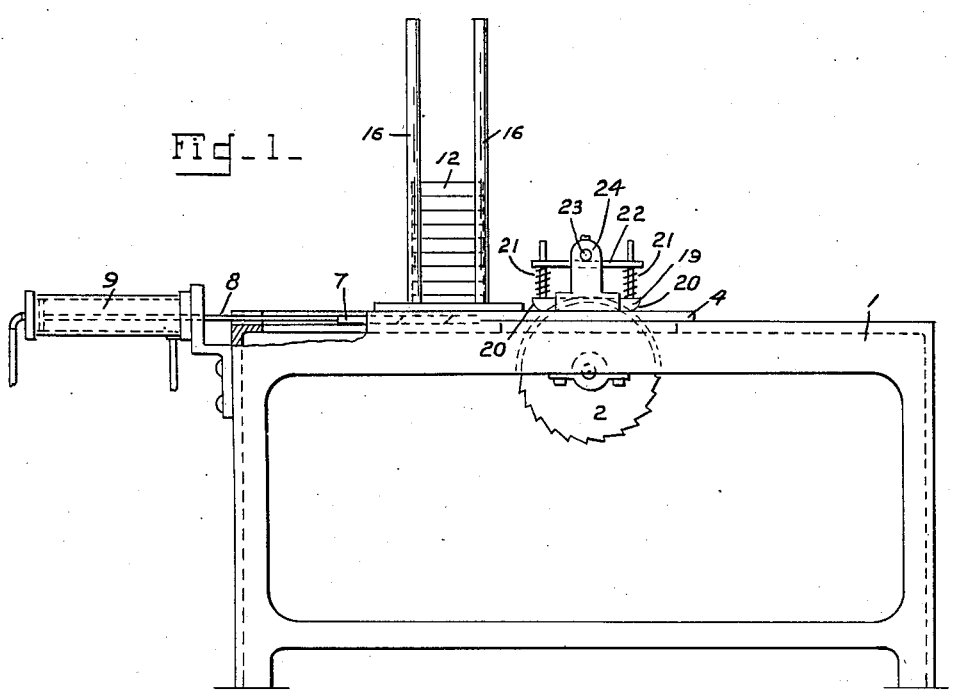
Fig_1_
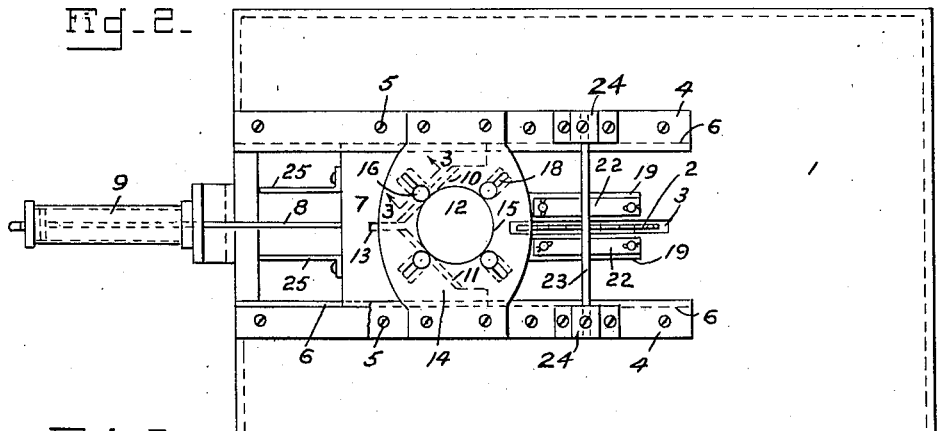
Fig_2_
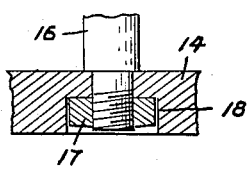
Fig_3_
Inventors
Edward M. Sims
Henry T. Weeks
Attorneys Patented Oct. 31, 1944

2,361,422

UNITED STATES PATENT OFFICE 2,361,422

WORK FEEDING DEVICE

Edward M. Sims and Henry T. Weeks,
Dover, N. J.

Application June 29, 1942, Serial No. 449,030

1 Claim. (Cl. 144—245)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to a device for feeding work pieces to a processing machine and relates in particular to a unit designed for feeding into a saw wooden disks employed in bomb packing.

The invention comprises a hopper to hold the work pieces and means for receiving, centering and carrying to the saw the piece to be cut and repeating the cycle by a simple reciprocating action.

It is therefore an object of the invention to provide an improved form of feeding device operating under a simple reciprocating action and wherein the presentation of work pieces is accomplished by action of gravity.

The specific nature of the invention as well as other objects and advantages thereof will clearly appear from a description of a preferred embodiment as shown in the accompanying drawing in which:

Figure 1 is an elevational view of a machine according to the invention,

Figure 2 is a top plan view of the same, and

Figure 3 is a section taken on the line 3—3 of Figure 2.

Referring to the drawing by characters of reference, there is shown generally at 1 a table forming a support for the entire mechanism. A saw 2, powered by any convenient means (not shown) is suitably journaled in the table 1 so as to extend a slight distance through a slot 3 in the table 1. Fixed to the table is a crosshead guide comprising a pair of bars 4 fixed to the table as by screws 5, and having an overhanging portion 6 to confine a reciprocating pusher member 7. The latter is connected through a rod 8 to a piston assemblage shown generally at 9, adapted to be operated by steam or other fluid pressure. The piston unit shown, of course may be replaced by any power means such as an electric motor, or the pusher 7 may be actuated by manual means.

Pusher 7 is formed with a V slot 10, the sides of which have a recessed bevel 11 so that the upper edges will determine the centering of the work piece 12 lying on the table 1. The bevel is provided because the lower edges of the V slot would not afford reliable centering due to accumulation of sawdust. In place of the V slot simple radial arms may be employed, but these should also have the bevelled face. At the apex of the V a straight slot 13 is provided to clear the saw and permit further travel of the work piece.

The hopper for the work piece comprises a base 14 fixed to the crosshead guides 4. This has a central opening 15 for passing the work pieces 12, and the body of the hopper directing the work pieces to the exit opening 15 is composed of upright members 16 fastened as by screw threading to rectangular non-rotatable nuts 17 which are slidable in T slots 18 provided in hopper base 14 so that the size of the hopper may be adjusted.

A holding member for the work during the sawing operation comprises bars 19 with rounded ends 20 located on either side of the saw held by pressure of springs 21 reacting against bars 22 which in turn are held by and fulcrumed on a rod 23 carried by uprights 24. Extension 25 may be provided on the pusher to limit rearward motion.

*Operation.*—The work pieces are loaded into the hopper 15, the lowermost one resting on the table 1. As the pusher 7 is advanced, either by hand or power means, it engages the lowermost work piece in the V slot and carries it forward, at the same time centering it with respect to the saw, in this case so that the latter will cut along a diameter. The pusher 7 is somewhat less in thickness than the work piece so as to engage only the lowermost one. After the bottom work piece has cleared the stack in the hopper, the next piece will drop into place on the pusher 7 and after the latter has been fully retracted the piece will drop to the table in position to be engaged by the V slot or other centering means. The sawed halves are easily disposed of manually, or automatic means may be provided to carry them away from the machine.

It will be noted that the hopper employed not only exhibits features of ready adjustability but also by its open structure permits ready inspection and adjustment of the stack of work pieces.

We claim:

A machine for severing disks comprising a table, a circular saw thereon, a unitary pusher bar supported by and reciprocable on said table relative to the saw, said bar being formed with a V-shaped recess for centering the disk, said recess having a slot in the apex thereof for the clearance of the saw, the edge of the recess sloping to provide a leading upper edge for centering the disk and preventing saw dust from interfering with the centering function of said V-shaped recess, and spring backed means flanking the saw and positioned to bear on the disk to hold it yieldingly and slidably against the table while being operated upon by the saw.

EDWARD M. SIMS.
HENRY T. WEEKS.